United States Patent
Liu et al.

(10) Patent No.: US 10,797,493 B2
(45) Date of Patent: Oct. 6, 2020

(54) BATTERY, TERMINAL, AND CHARGING SYSTEM

(71) Applicant: HUAWEI TECHNOLOGIES CO., LTD., Shenzhen, Guangdong (CN)

(72) Inventors: Xinyu Liu, Shenzhen (CN); Pinghua Wang, Shenzhen (CN); Ce Liu, Shenzhen (CN); Yanding Liu, Shenzhen (CN); Jinbo Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/359,061

(22) Filed: Mar. 20, 2019

(65) Prior Publication Data

US 2019/0222039 A1 Jul. 18, 2019

Related U.S. Application Data

(63) Continuation of application No. PCT/CN2017/092978, filed on Jul. 14, 2017.

(30) Foreign Application Priority Data

Sep. 20, 2016 (CN) .......................... 2016 1 0836764

(51) Int. Cl.
*H02J 7/00* (2006.01)
*H01M 10/46* (2006.01)
(Continued)

(52) U.S. Cl.
CPC ......... *H02J 7/0029* (2013.01); *H01M 10/425* (2013.01); *H01M 10/46* (2013.01);
(Continued)

(58) Field of Classification Search
CPC .......... H02J 7/0029; H02J 7/34; H02J 7/0031; H02J 7/0045; H02J 7/00302;
(Continued)

(56) References Cited

U.S. PATENT DOCUMENTS

| | | | |
|---|---|---|---|
| 5,892,351 A * | 4/1999 | Faulk | H01M 2/34 320/125 |
| 7,068,012 B1 * | 6/2006 | Geren | H01M 2/348 320/134 |

(Continued)

FOREIGN PATENT DOCUMENTS

| | | |
|---|---|---|
| CN | 101334452 A | 12/2008 |
| CN | 202395115 U | 8/2012 |

(Continued)

OTHER PUBLICATIONS

Chinese Office Action issued in Chinese Application No. 201610836764.3 dated Jul. 25, 2018, 16 pages.

(Continued)

*Primary Examiner* — M Baye Diao
(74) *Attorney, Agent, or Firm* — Fish & Richardson P.C.

(57) ABSTRACT

An example battery, a terminal, or a charging system can include a battery charging port, a battery discharging port, a battery negative port, an overcurrent protection element, a protection integrated circuit, a control switch, and an electrochemical cell. The battery charging port is connected to a positive electrode of the electrochemical cell, the control switch is connected in series between a negative electrode of the electrochemical cell and the battery negative port, the protection integrated circuit is connected in parallel to two ends of the electrochemical cell, and the protection integrated circuit is further connected to the control switch, so as to send a control signal to the control switch. In addition, the overcurrent protection element is connected in series (Continued)

between the battery discharging port and the positive electrode of the electrochemical cell.

18 Claims, 7 Drawing Sheets

(51) Int. Cl.
 *H01M 10/42* (2006.01)
 *H02J 7/34* (2006.01)
(52) U.S. Cl.
 CPC .......... *H02J 7/0031* (2013.01); *H02J 7/0045* (2013.01); *H02J 7/34* (2013.01); *H01M 2010/4271* (2013.01); *H02J 7/00302* (2020.01); *H02J 7/00304* (2020.01); *H02J 7/00306* (2020.01)
(58) Field of Classification Search
 CPC .. H02J 7/00304; H02J 7/00306; H01M 10/46; H01M 10/425; H01M 2010/4271
 USPC .......................................................... 320/107
 See application file for complete search history.

(56) References Cited

U.S. PATENT DOCUMENTS

| | | | | |
|---|---|---|---|---|
| 7,626,360 | B2* | 12/2009 | Melanson ............. | H02J 7/0031 320/127 |
| 7,830,120 | B2* | 11/2010 | Ibrahim ................ | H02J 7/0031 307/10.7 |
| 8,179,097 | B2 | 5/2012 | Yun | |
| 8,525,482 | B2* | 9/2013 | Takeda ................. | H02J 7/0029 320/136 |
| 10,090,689 | B2* | 10/2018 | Pan ....................... | H02H 3/093 |
| 2004/0109274 | A1* | 6/2004 | Sato ...................... | H02J 7/0031 361/90 |
| 2005/0275370 | A1* | 12/2005 | Kim .................... | H01H 85/0241 320/107 |
| 2007/0210751 | A1 | 9/2007 | Wang et al. | |
| 2007/0247115 | A1 | 10/2007 | Ishikawa et al. | |
| 2009/0001934 | A1 | 1/2009 | Xiao et al. | |
| 2013/0181681 | A1 | 7/2013 | Mukai et al. | |
| 2016/0149424 | A1 | 5/2016 | Tonomura et al. | |
| 2017/0033574 | A1* | 2/2017 | Imaizumi ............. | H02J 7/0072 |
| 2017/0095667 | A1* | 4/2017 | Yakovlev ........... | A61N 1/36125 |
| 2017/0214264 | A1* | 7/2017 | Wang ................... | H01M 10/48 |
| 2017/0264114 | A1 | 9/2017 | Zhang et al. | |
| 2018/0069357 | A1 | 3/2018 | Zhang et al. | |
| 2018/0226816 | A1* | 8/2018 | Na ........................ | H02J 7/0029 |
| 2019/0089170 | A1* | 3/2019 | Liu ........................ | H02J 7/007 |
| 2019/0214832 | A1* | 7/2019 | Li ......................... | H02J 7/0026 |

FOREIGN PATENT DOCUMENTS

| | | |
|---|---|---|
| CN | 203056648 U | 7/2013 |
| CN | 103493330 A | 1/2014 |
| CN | 104052087 A | 9/2014 |
| CN | 104218632 A | 12/2014 |
| CN | 104283283 A | 1/2015 |
| CN | 104810640 A | 7/2015 |
| CN | 104810878 A | 7/2015 |
| CN | 104953168 A | 9/2015 |
| CN | 102916456 B | 11/2015 |
| CN | 105870990 A | 8/2016 |
| CN | 105934075 A | 9/2016 |
| EP | 2194600 A1 | 6/2010 |
| JP | H10208779 A | 8/1998 |
| JP | 2007511380 A | 5/2007 |
| JP | 2011139550 A | 7/2011 |
| WO | 2012147598 A1 | 11/2012 |
| WO | 2015113353 A1 | 8/2015 |

OTHER PUBLICATIONS

Chinese Office Action issued in Chinese Application No. 201610836764.3 dated Nov. 23, 2019, 15 pages.
Chinese Search Report issued in Chinese Application No. 201610836764.3 dated Dec. 28, 2017, 16 pages.
International Search Report and Written Opinion issued in International Application No. PCT/CN2017/092978 dated Oct. 18, 2017, 18 pages.
Extended European Search Report issued in European Application No. 17852214.0 dated Sep. 23, 2019, 9 pages.
Office Action issued in Japanese Application No. 2019-515495 dated Aug. 3, 2020, 6 pages (with English translation).

\* cited by examiner

BATTERY, TERMINAL, AND CHARGING SYSTEM

CROSS-REFERENCE TO RELATED APPLICATIONS

This application is a continuation of International Application No. PCT/CN2017/092978, filed on Jul. 14, 2017, which claims priority to Chinese Patent Application No. 201610836764.3, filed on Sep. 20, 2016. The disclosures of the aforementioned applications are hereby incorporated by reference in their entireties.

TECHNICAL FIELD

The present application relates to charging technologies, and in particular, to a battery, a terminal, and a charging system.

BACKGROUND

With development of science and technology, functions of terminals become increasingly powerful. Users can work and have fun by using terminals, to such an extent that the terminals have become an integral part of people's daily life. However, because a battery life of a terminal is limited, a user needs to constantly charge the terminal.

It should be noted that currently, a terminal is usually equipped with a lithium-ion battery, and during use of the lithium-ion battery, a protection circuit needs to be provided to effectively monitor charging and discharging states of the lithium-ion battery, and disconnect a charging and discharging loop in an unsafe condition, thereby preventing damage to the lithium-ion battery in advance. In addition to the foregoing structure design of the lithium-ion battery and protection by a battery protection board, a level-2 safety protection element (for example, an overcurrent protection element) is further used in a charging and discharging circuit of the lithium-ion battery, to strengthen safety protection during charging and discharging of the lithium-ion battery.

For example, a current terminal is usually charged at a power not exceeding 20 W, and a charging current range is 1 A to 4 A. When the terminal is being charged, impedance heating of a level-2 protection element in a charging circuit is not obvious, and a charging voltage loss is not large. Therefore, a safety protection requirement in the charging process can be satisfied. However, with an increase in a battery energy density and an increase in a battery capacity configuration, to implement fast charging, a higher charging current needs to be introduced into a charging circuit of a lithium-ion battery.

As shown in FIG. 1, FIG. 1 shows a specific charging and discharging path in the prior art. When a battery is charged by using an external charger, a current reaches an electrochemical cell through elements such as an overcurrent protection element and a control switch. When the battery supplies power to a terminal load, a current reaches the terminal load through the control switch, the overcurrent protection element, and a power conversion circuit. It may be learned from the foregoing that during both charging and discharging of the battery, the elements such as the overcurrent protection element and the control switch need to be used. In a large-current scenario, for example, in a fast charging manner (for example, 9 V 4.4 A or 5 V 8 A) with a power of 40 W, a charging current exceeds 4 A or even reaches 8 A. Such a large current causes large heat losses when passing through an overcurrent protection element, resulting in severe heating of the overcurrent protection element. This may pose a safety problem for lithium-ion batteries and further bring inconvenience to users.

SUMMARY

Embodiments of the present application provide a battery, a terminal, and a charging system, so as to safely and fast charge the terminal, thereby improving user experience.

A first aspect of the present application provides a battery, and the battery includes a battery charging port, a battery discharging port, a battery negative port, an overcurrent protection element, a protection integrated circuit, a control switch, and an electrochemical cell, where the battery charging port and the battery discharging port are different ports, and it should be noted that the protection integrated circuit may be referred to as a protection IC for short;

the battery charging port is connected to a positive electrode of the electrochemical cell, a negative electrode of the electrochemical cell is connected to a first end of the control switch, and a second end of the control switch is connected to the battery negative port;

the protection IC is connected in parallel to the positive electrode and the negative electrode of the electrochemical cell, and the protection IC is further connected to a third end of the control switch; and the battery discharging port is connected to a first end of the overcurrent protection element, and a second end of the overcurrent protection element is connected to the positive electrode of the electrochemical cell.

With reference to the first aspect, it should be noted that when the battery is in a charging state, a current enters the battery through the battery charging port and flows to the electrochemical cell, where the protection IC is configured to: detect a current value of a charging current and a voltage value of a charging voltage; and when the current value is less than a first current threshold and the voltage value is less than a first voltage threshold, send a turn-on instruction to the control switch; or when the current value is greater than a first current threshold or the voltage value is greater than a first voltage threshold, send a turn-off instruction to the control switch; and the control switch is configured to: when receiving the turn-on instruction sent by the protection IC, perform switch turning-on to enable the charging current to flow to the electrochemical cell; or when receiving the turn-off instruction sent by the protection IC, perform switch turning-off to cut off a charging path.

With reference to the first aspect, it should be noted that when the battery is in a discharging state, a current flows out from the electrochemical cell, reaches the battery discharging port through the overcurrent protection element, and flows out from the battery discharging port, where the protection IC is configured to: detect a current value of a discharging current and a voltage value of a discharging voltage; and when the current value is greater than a second current threshold or the voltage value is greater than a second voltage threshold, send a turn-off instruction to the control switch;

the control switch is configured to: when receiving the turn-off instruction sent by the protection IC, turn off the switch to cut off a discharging path; and the overcurrent protection element is configured to: detect whether the current value of the discharging current exceeds a third current threshold; and when the current value of the discharging current exceeds the third current threshold, cut off the discharging path.

With reference to the first aspect, it should be noted that the protection IC is connected in parallel to the two ends of the electrochemical cell, and may measure voltages at the two ends of the electrochemical cell.

Further, to accurately measure the voltages at the two ends of the electrochemical cell, a filter circuit is further connected between the protection IC and the electrochemical cell;

the filter circuit includes a first resistor and a capacitor; and the protection IC includes a positive power source input terminal and a negative power source input terminal, where a first end of the first resistor is connected to the positive electrode of the electrochemical cell, a second end of the first resistor is connected to a first end of the capacitor, and a second end of the capacitor is connected to the negative electrode of the electrochemical cell; and the positive power source input terminal is connected to the first end of the capacitor, and the negative power source input terminal is connected to the second end of the capacitor.

Further, it should be noted that the protection IC further includes a current detection terminal; and the current detection terminal is connected to the battery negative port by using a second resistor.

With reference to the first aspect, it should be noted that the protection IC includes a charging control terminal and a discharging control terminal; and the control switch includes a first MOS transistor and a second MOS transistor, where the charging control terminal is configured to send a control signal to the first MOS transistor, to control turn-on and turn-off of the first MOS transistor; and the discharging control terminal is configured to send a control signal to the second MOS transistor, to control turn-on and turn-off of the second MOS transistor.

Specifically, a first end of the first MOS transistor is connected to the negative electrode of the electrochemical cell, a second end of the first MOS transistor is connected to a first end of the second MOS transistor, and a third end of the first MOS transistor is connected to the charging control terminal; and a second end of the second MOS transistor is connected to the battery negative port, and a third end of the second MOS transistor is connected to the discharging control terminal.

A second aspect of the present application discloses another battery, and the battery includes a battery charging port, a battery discharging port, a battery negative port, an overcurrent protection element, a protection IC, a first control switch, a second control switch, and an electrochemical cell, where the battery charging port and the battery discharging port are ports independent of each other;

the battery charging port is connected to a first end of the first control switch, a second end of the first control switch is connected to a positive electrode of the electrochemical cell, and a third end of the first control switch is connected to the protection IC;

a negative electrode of the electrochemical cell is connected to the battery negative port;

the protection IC is connected in parallel to two ends of the electrochemical cell; and the battery discharging port is connected to a first end of the overcurrent protection element, a second end of the overcurrent protection element is connected to a first end of the second control switch, a second end of the second control switch is connected to the positive electrode of the electrochemical cell, and a third end of the second control switch is connected to the protection IC.

With reference to the second aspect, it should be noted that when the battery is in a charging state, a current enters the battery through the battery charging port and flows to the electrochemical cell through the first control switch, where the protection IC is configured to: detect a current value of a charging current and a voltage value of a charging voltage; and when the current value is less than a first current threshold and the voltage value is less than a first voltage threshold, send a turn-on instruction to the first control switch; or when the current value is greater than a first current threshold or the voltage value is greater than a first voltage threshold, send a turn-off instruction to the first control switch; and the first control switch is configured to: when receiving the turn-on instruction sent by the protection IC, perform switch turning-on to enable the charging current to flow to the electrochemical cell; or when receiving the turn-off instruction sent by the protection IC, perform switch turning-off to cut off a charging path.

With reference to the second aspect, it should be noted that when the battery is in a discharging state, a current flows out from the electrochemical cell, reaches the battery discharging port through the second control switch and the overcurrent protection element, and flows out from the battery discharging port, where the protection IC is configured to: detect a current value of a discharging current and a voltage value of a discharging voltage; and when the current value is greater than a second current threshold or the voltage value is greater than a second voltage threshold, send a turn-off instruction to the second control switch;

the second control switch is configured to: when receiving the turn-off instruction sent by the protection IC, turn off the switch to cut off a discharging path; and the overcurrent protection element is configured to: detect whether the current value of the discharging current exceeds a third current threshold; and when the current value of the discharging current exceeds the third current threshold, cut off the discharging path.

With reference to the second aspect, it should be noted that the protection IC includes a charging control terminal and a discharging control terminal; and the third end of the first control switch is connected to the charging control terminal, and the third end of the second control switch is connected to the discharging control terminal.

With reference to the second aspect, it should be noted that a filter circuit is further connected between the protection IC and the electrochemical cell;

the filter circuit includes a first resistor and a capacitor; and the protection IC includes a positive power source input terminal and a negative power source input terminal, where a first end of the inductor is connected to the positive electrode of the electrochemical cell, a second end of the inductor is connected to a first end of the capacitor, and a second end of the capacitor is connected to the negative electrode of the electrochemical cell; and the positive power source input terminal is connected to the first end of the capacitor, and the negative power source input terminal is connected to the second end of the capacitor.

With reference to the second aspect, it should be noted that the first control switch may be a MOS transistor, and the second control switch may also be a MOS transistor.

With reference to the second aspect, it should be noted that the protection IC further includes a current detection terminal, the current detection terminal is connected to the battery negative port by using a second resistor, and the protection IC may detect a value of a charging current and a value of a discharging current by using the current detection terminal.

A third aspect of the present application discloses another battery, and the battery includes a battery charging port, a battery discharging port, a battery negative port, an overcurrent protection element, a protection IC, a control switch, and an electrochemical cell, where the battery charging port and the battery discharging port are ports independent of each other;

the battery charging port is connected to a first end of the control switch, and a second end of the control switch is connected to a positive electrode of the electrochemical cell;

a negative electrode of the electrochemical cell is connected to the battery negative port;

the protection IC is connected in parallel to two ends of the electrochemical cell, and the protection IC is further connected to a third end of the control switch; and the battery discharging port is connected to a first end of the overcurrent protection element, and a second end of the overcurrent protection element is connected to the first end of the control switch.

With reference to the third aspect, it should be noted that when the battery is in a charging state, a current enters the battery through the battery charging port and flows to the electrochemical cell through the control switch, where the protection IC is configured to: detect a current value of a charging current and a voltage value of a charging voltage; and when the current value is less than a first current threshold and the voltage value is less than a first voltage threshold, send a turn-on instruction to the control switch; or when the current value is greater than a first current threshold or the voltage value is greater than a first voltage threshold, send a turn-off instruction to the control switch; and the control switch is configured to: when receiving the turn-on instruction sent by the protection IC, perform switch turning-on to enable the charging current to flow to the electrochemical cell; or when receiving the turn-off instruction sent by the protection IC, perform switch turning-off to cut off a charging path.

With reference to the third aspect, it should be noted that when the battery is in a discharging state, a current flows out from the electrochemical cell, reaches the battery discharging port through the control switch and the overcurrent protection element, and flows out from the battery discharging port, where the protection IC is configured to: detect a current value of a discharging current and a voltage value of a discharging voltage; and when the current value is greater than a second current threshold or the voltage value is greater than a second voltage threshold, send a turn-off instruction to the control switch;

the control switch is configured to: when receiving the turn-off instruction sent by the protection IC, turn off the switch to cut off a discharging path; and the overcurrent protection element is configured to: detect whether the current value of the discharging current exceeds a third current threshold; and when the current value of the discharging current exceeds the third current threshold, cut off the discharging path.

With reference to the third aspect, it should be noted that the control switch includes a first metal-oxide semiconductor field-effect transistor MOS transistor and a second MOS transistor; and the protection IC includes a charging control terminal and a discharging control terminal, where a first end of the first MOS transistor is connected to the second end of the overcurrent protection element, and the first end of the first MOS transistor is further connected to the battery charging port;

a second end of the first MOS transistor is connected to a first end of the second MOS transistor, and a third end of the first MOS transistor is connected to the charging control terminal; and a second end of the second MOS transistor is connected to the positive electrode of the electrochemical cell, and a third end of the second MOS transistor is connected to the discharging control terminal.

With reference to the third aspect, it should be noted that a filter circuit is further connected between the protection IC and the electrochemical cell;

the filter circuit includes a first resistor and a capacitor; and the protection IC includes a positive power source input terminal and a negative power source input terminal, where a first end of the first resistor is connected to the positive electrode of the electrochemical cell, a second end of the first resistor is connected to a first end of the capacitor, and a second end of the capacitor is connected to the negative electrode of the electrochemical cell; and the positive power source input terminal is connected to the first end of the capacitor, and the negative power source input terminal is connected to the second end of the capacitor.

With reference to the third aspect, it should be noted that the protection IC further includes a current detection terminal, the current detection terminal is connected to the battery negative port by using a second resistor, and the protection IC may detect a value of a charging current and a value of a discharging current by using the current detection terminal.

A fourth aspect of the present application discloses a terminal, where the terminal includes a charging port, a load, and a charging and discharging circuit of the terminal, and the battery according to any one of the first to the third aspect, where the charging and discharging circuit includes a detection circuit, a protection circuit, and a power conversion circuit;

the detection circuit is connected to the charging port of the terminal, the detection circuit is further connected to the protection circuit, and the protection circuit is further connected to the battery charging port; and the power conversion circuit is connected to the load, and the power conversion circuit is further connected to the battery discharging port, where when the terminal is in a charging state, a charging current enters the terminal through the charging port of the terminal, and enters the electrochemical cell through the detection circuit, the protection circuit, and the control switch; and when the terminal is in a discharging state, a discharging path flows out from the electrochemical cell, and flows to the load through the control switch, the overcurrent protection element, and the power conversion circuit.

With reference to the fourth aspect, it should be noted that, when the terminal is in the charging state, the detection circuit is configured to: detect a current value of the charging current and a voltage value of the charging current, and send the current value of the charging current and the voltage value of the charging current to the protection circuit; and the protection circuit is configured to: determine whether the current value of the charging current is greater than a first protection threshold and the voltage value of the charging current is greater than a second protection threshold; and cut off a charging path when the current value of the charging current is greater than the first protection threshold or the voltage value of the charging current is greater than the second protection threshold.

With reference to the fourth aspect, it should be noted that, when the terminal is in the discharging state, the power conversion circuit is configured to: receive a discharging current and a discharging voltage provided by the battery, and convert the discharging current and the discharging voltage according to a preset ratio, so as to provide a voltage and a current that are obtained after the conversion to the load.

A fifth aspect of the present application discloses a charging system, where the charging system includes a charger, a connection cable, and the terminal according to the fourth aspect, where the charger is connected to the terminal by using the connection cable.

It may be learned from the foregoing that the technical solutions of the present application provide the battery, the terminal, and the charging system. The battery includes the battery charging port, the battery discharging port, the battery negative port, the overcurrent protection element, the protection IC, the control switch, and the electrochemical cell, where the battery charging port and the battery discharging port are ports independent of each other; the battery charging port is connected to the positive electrode of the electrochemical cell, the negative electrode of the electrochemical cell is connected to the first end of the control switch, and the second end of the control switch is connected to the battery negative port; the protection IC is connected in parallel to the two ends of the electrochemical cell, and the protection IC is further connected to the third end of the control switch; and the battery discharging port is connected to the first end of the overcurrent protection element, and the second end of the overcurrent protection element is connected to the positive electrode of the electrochemical cell. The battery provided in the present application has both a charging path and a discharging path. By means of the charging path, large-current fast charging may be safely performed on the terminal, without causing severe heating of the overcurrent protection element, thereby improving user experience. Further, when the battery is in the discharging state, whether a current is overloaded can be detected on the discharging path; and when a current is overloaded, a discharging circuit is cut off, thereby ensuring that the battery is in a safe state.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following descriptions show merely some embodiments of the present application, and a person of ordinary skill in the art may still derive other drawings from these accompanying drawings without creative efforts.

DESCRIPTION OF EMBODIMENTS

To make the purpose, technical solutions, and advantages of the embodiments of the present application more clearly, the following describes the technical solutions of the embodiments of the present application with reference to the accompanying drawings in the embodiments of the present application.

With development of science and technology, functions of terminals (for example, electronic devices such as a smartphone, a wearable device, and a tablet computer) become increasingly powerful. Users can work and have fun by using terminals, to such an extent that the terminals have become an integral part of people's daily life. However, because a battery life of a terminal is limited, a user needs to constantly charge the terminal.

It should be noted that currently, a terminal is usually equipped with a lithium-ion battery, and during use of the lithium-ion battery, a protection circuit needs to be provided to effectively monitor charging and discharging states of the lithium-ion battery, and disconnect a charging and discharging loop in an unsafe condition, thereby preventing damage to the lithium-ion battery in advance. In addition to the foregoing structure design of the lithium-ion battery and protection by a battery protection board, a level-2 safety protection element (for example, an overcurrent protection element) is further used in a charging and discharging circuit of the lithium-ion battery, to strengthen safety protection during charging and discharging of the lithium-ion battery.

To improve user experience, terminal manufacturers configure a fast charging function on each terminal at delivery. A current terminal is usually fast charged at a power not exceeding 20 W, and a charging current range is 1 A to 4 A. When the terminal is being charged, impedance heating of a level-2 protection element in a charging circuit is not obvious, and a charging voltage loss is not large. Therefore, a safety protection requirement in the charging process can be satisfied. However, with an increase in a battery energy density and an increase in a battery capacity configuration, to implement fast charging, a higher charging current needs to be introduced into a charging circuit of a lithium-ion battery.

Figure 1:
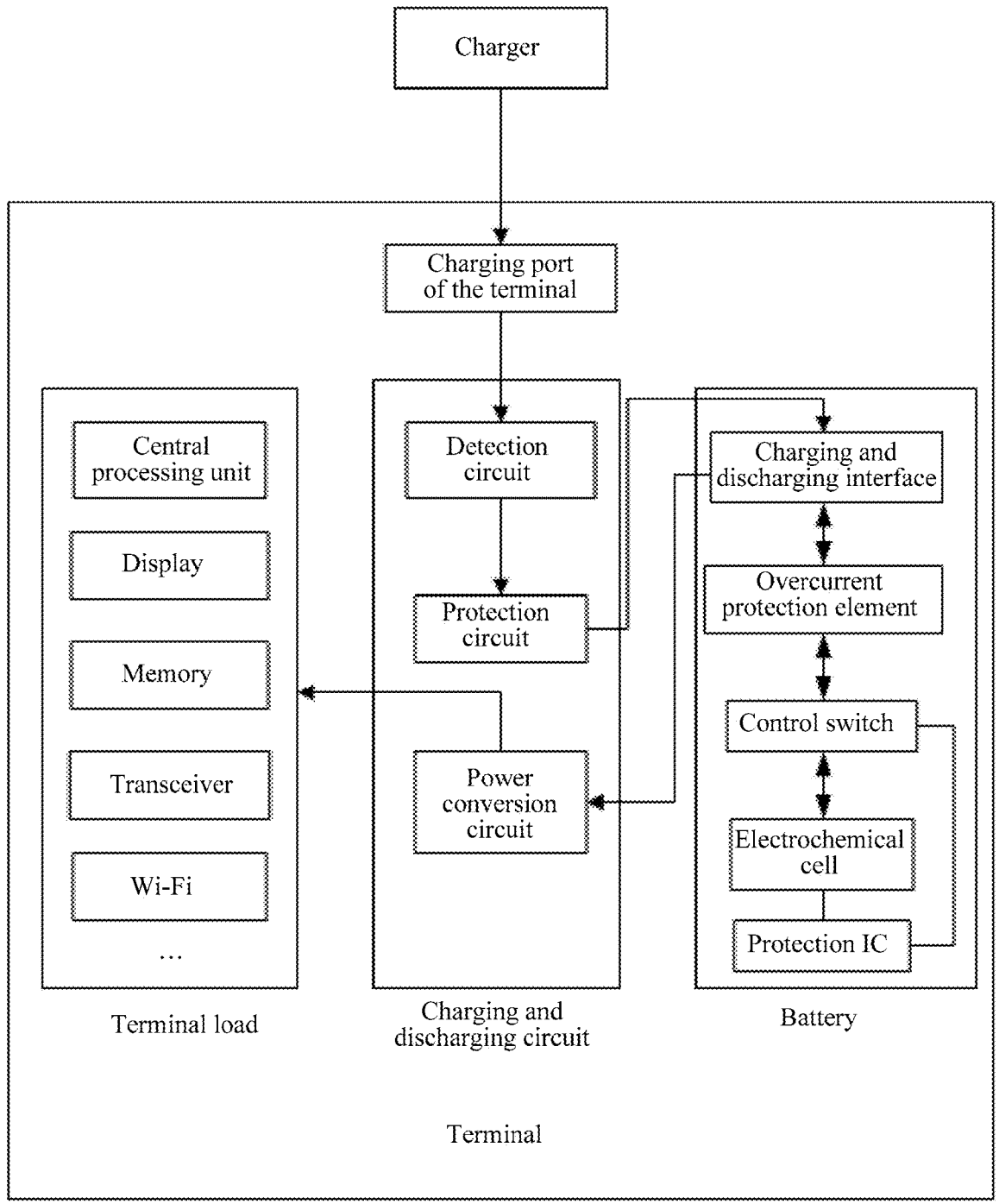
FIG. 1 is a schematic diagram of a charging and discharging path according to an embodiment of the present application.

As shown in FIG. 1, FIG. 1 shows a specific charging and discharging path in the prior art. When a battery is charged by using an external charger, a current reaches an electrochemical cell through elements such as an overcurrent protection element and a control switch. When the battery supplies power to a terminal load, a current reaches the terminal load through the control switch, the overcurrent protection element, and a power conversion circuit. It may be learned from the foregoing that during both charging and discharging of the battery, the elements such as the overcurrent protection element and the control switch need to be used. In a large-current scenario, for example, in a fast charging manner (for example, 9 V 4.4 A or 5 V 8 A) with a power of 40 W, a charging current exceeds 4 A or even reaches 8 A. Such a large current causes large heat losses when passing through an overcurrent protection element, resulting in severe heating. This may pose a safety problem for batteries and further bring inconvenience to users.

The present application provides a fast charging system (fast charging system for short). The fast charging system can implement fast and safe charging. For a specific schematic diagram of the fast charging system, refer to FIG. 2. The system includes a terminal, a charger, and a connection cable. The terminal is connected to the charger by using the connection cable.

The terminal may be an electronic device such as a smartphone, a tablet computer, a smart wearable device, or a computer.

Figure 2:
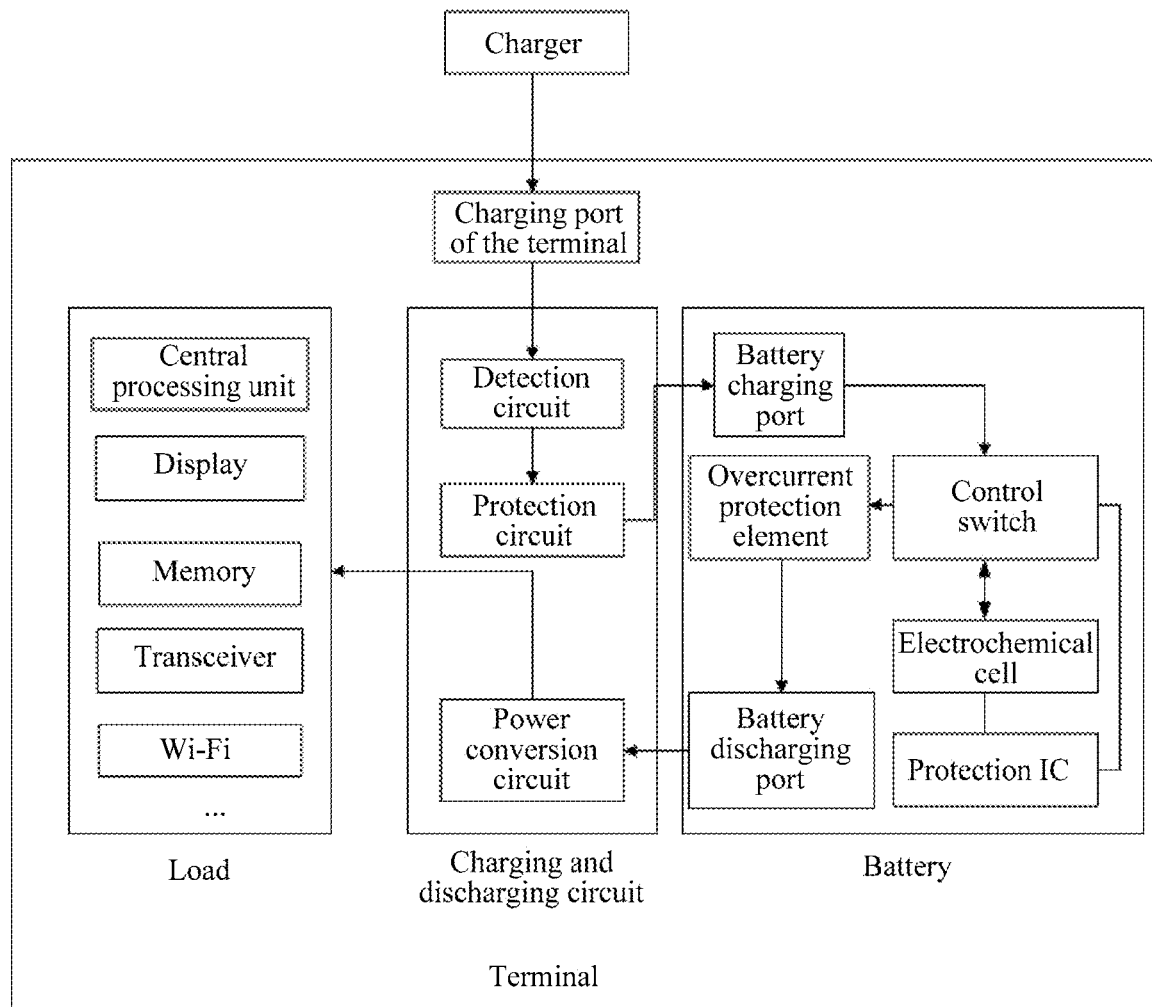
FIG. 2 is a schematic diagram of a fast charging system according to an embodiment of the present application.

As shown in FIG. 2, the terminal includes a charging port, a load, a charging and discharging circuit, and a battery of the terminal.

It should be noted that the battery supplies power to the load by using the charging and discharging circuit. In essence, the load may be an electricity consumption module other than the battery and the charging and discharging circuit, for example, a central processing unit, a touchscreen, a microphone, a memory, a communication module, and various sensors (such as a gyroscope, an accelerometer, and a proximity sensor). Examples are not listed one by one herein.

The battery includes a battery charging port, a battery discharging port, a battery negative port, an overcurrent protection element, a protection IC, a control switch, and an electrochemical cell. The battery charging port and the battery discharging port are ports independent of each other.

It should be noted that the control switch usually includes multiple MOSFET switch transistors (MOS transistor). The protection IC controls turn-on and turn-off of a MOSFET switch transistor (which may be referred to as a MOS transistor for short) to implement safety protection. The overcurrent protection element may be a current fuse, a temperature fuse, or a positive temperature coefficient resistor (PTCR) that has an overcurrent protection function.

It should be noted that electrochemical cells of batteries in existing terminals are mostly lithium-ion batteries or lithium batteries, or may be air batteries, fuel cells, or the like. This is not limited herein.

When a lithium-ion battery is used, a working voltage of the lithium-ion battery ranges from 2.5 V to 4.4 V, and due to a material of the lithium-ion battery, the lithium-ion battery cannot be overcharged, over-discharged, or charged or discharged at ultra-high temperature, and an overcurrent or a short-circuit cannot occur on the lithium-ion battery. Therefore, a corresponding protection IC is usually configured for a lithium-ion electrochemical cell. The protection IC is short for a protection integrated circuit, and in the industry, the protection IC is also referred to as a lithium-ion battery protection board. The protection IC may be configured to perform overcharge protection, over-discharge protection, and overcurrent/short-circuit protection.

Specifically, for the overcharge protection: when the lithium-ion battery is charged by using an external charger, charging needs to be stopped to avoid an internal pressure increase caused by a temperature increase. In this case, the protection IC needs to detect a battery voltage. When the voltage reaches 4.25 V (it is assumed that an overcharge point of the battery is 4.25 V), the protection IC activates overcharge protection and sends a turn-off command to the control switch, so as to stop charging.

Specifically, for the over-discharge protection: in an over-discharge situation, due to electrolyte decomposition, a battery characteristic is deteriorated and a quantity of charging times is reduced. The protection IC of the lithium-ion battery is configured to protect the battery from being over-discharged, so as to implement protection. To prevent the lithium-ion battery from being over-discharged, assuming that the lithium-ion battery is connected to the load, when a voltage of the lithium-ion battery is less than an over-discharge voltage detection point (it is assumed that the over-discharge voltage detection point is set to 2.3 V), over-discharge protection is activated, and a turn-off instruction is sent to the control switch to stop discharging. Therefore, protection is implemented to avoid over-discharge of the battery, and the battery is kept in a low quiescent current state. In this case, power consumption is 0.1 µA. When the lithium-ion battery is connected to the charger, and a voltage of the lithium-ion battery is greater than an over-discharge voltage in this case, the over-discharge protection function is deactivated.

Specifically, for the overcurrent and short-circuit current protection: when an overcurrent or a short-circuit current occurs due to an unknown reason (during discharging or when a positive or negative electrode is inadvertently touched by a metal), discharging of the battery is stopped to ensure safety.

As shown in FIG. 2, the charging and discharging circuit is connected to the battery, and is further connected to the load.

The charging and discharging circuit includes a detection circuit, a protection circuit, and a power conversion circuit.

It should be noted that the detection circuit is configured to detect, in real time, parameters of a current and a voltage passing through a charging and discharging path, and may further obtain battery physical parameters such as temperature and pressure in a battery unit. The detection circuit may be specifically a current detection circuit, a voltage detection circuit, a current sensor, a voltage sensor, a temperature sensor, a pressure sensor, or the like. Details are not described herein.

The protection circuit is usually a switch device or a switch transistor. When the parameter such as the voltage, the current, the temperature, or the pressure obtained by the detection circuit is greater than or less than a threshold, the protection circuit is turned off to cut off the charging and discharging path, to stop charging of the battery. For example, value ranges of protection threshold parameters of the protection circuit are listed in the following table.

|  | Upper threshold | Lower threshold |
| --- | --- | --- |
| Voltage/V | 4.4 | 2.5 |
| Current/A | 10 | None |
| Temperature/° C. | 45 | −10 |

It should be noted that when the battery supplies power to the outside, because an output voltage at a battery end is a variable, the power conversion circuit is disposed in the charging and discharging circuit. The power conversion circuit converts the battery output voltage to an actual supply voltage required by the load.

As shown in FIG. 2, the terminal includes a charging circuit and a discharging circuit.

Specifically, a connection manner of the charging circuit is that the charging port of the terminal is connected to the detection circuit, the detection circuit is further connected to the protection circuit, and the protection circuit is further connected to the battery charging port.

Specifically, a connection manner of the discharging circuit is that the battery discharging port is connected to the power conversion circuit, and the power conversion circuit is connected to the load.

It may be understood that when the terminal is in a charging state, a charging current flows into the terminal through the charging interface or port of the terminal, and reaches the electrochemical cell through the detection circuit, the protection circuit, the battery charging port, and the control switch.

It should be noted that when the terminal is in the charging state, the detection circuit is configured to: detect a current value of the charging current and a voltage value of the charging current, and send the current value of the charging current and the voltage value of the charging current to the protection circuit. The protection circuit is configured to: determine whether the current value of the charging current is greater than a current protection threshold and the charging voltage value is greater than a voltage protection threshold; and cut off a charging path when the current value of the charging current is greater than the current protection threshold or the charging voltage value is greater than the voltage protection threshold. The protection circuit may be a switch. When the current value of the charging current is greater than the current protection threshold or the voltage value of the charging voltage is greater than the voltage protection threshold, the switch is turned off.

It should be noted that the current protection threshold and the voltage protection threshold may be set by a terminal manufacturer, or may be set by a manufacturer of the charging and discharging circuit.

It may be understood that when the terminal is in a discharging state, a discharging current flows out from the battery and reaches the load through the power conversion circuit.

It should be noted that when the terminal is in the discharging state, the power conversion circuit is configured to: receive a discharging current and a discharging voltage provided by the battery, and convert the discharging current and the discharging voltage according to a preset ratio, so as to provide a voltage and a current that are obtained after the conversion to the load.

A common load includes a device such as a display, a central processing unit, a memory, a transceiver, or a wireless fidelity (Wi-Fi).

An embodiment of the present application provides a charging method, and the method may be applied to the terminal shown in FIG. 2. When the terminal is being charged, the method may provide double charging protection:

(1) First, the charging and discharging circuit detects a charging current and a charging voltage to determine whether an overvoltage or overcurrent occurs; and if an overvoltage or overcurrent occurs, sends a switch turn-off instruction to the protection circuit, so that the protection circuit cuts off the charging path.

(2) Second, the protection IC in the battery detects a charging current and a charging voltage to determine whether an overvoltage or overcurrent occurs; and if an over-voltage or overcurrent occurs, the protection IC sends a switch turn-off instruction to the control switch, so that the control switch cuts off the charging path.

An embodiment of the present application provides a discharging method, and the method may be applied to the terminal shown in FIG. 2. When the terminal is being discharged, the method may provide double discharging protection:

(1) First, the protection IC detects a voltage and a current that are output by the electrochemical cell to determine whether an overvoltage or overcurrent occurs; and if an overvoltage or overcurrent occurs, the protection IC sends a switch turn-off instruction to the control switch, so that the control switch cuts off the discharging path.

(2) Second, the overcurrent protection element detects a current value of a discharging current to determine whether an overcurrent occurs; and if it is detected that an overcurrent phenomenon occurs for the discharging current, cuts off the discharging path.

Figure 2A:
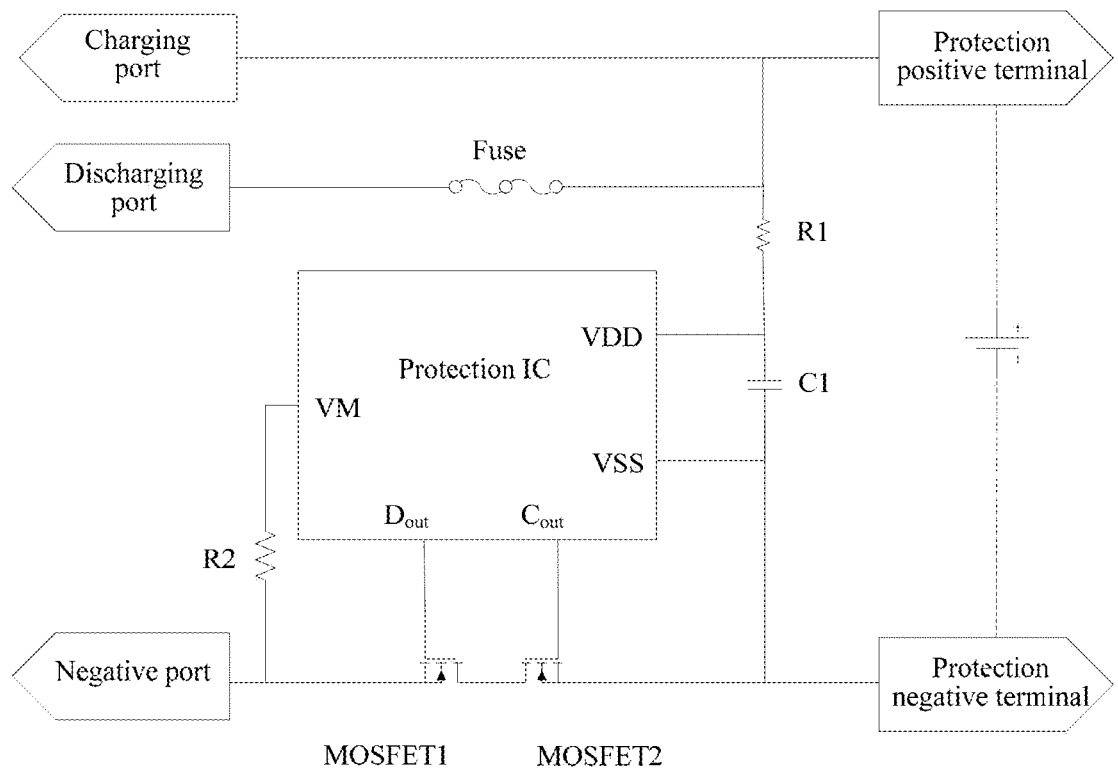
FIG. 2a shows a dual-path battery according to an embodiment of the present application.

As shown in FIG. 2a, FIG. 2a discloses a dual-path battery. The battery specifically includes an electrochemical cell, a protection IC, a MOSFET switch transistor, a fuse, a filter resistor R1, a filter capacitor C1, and a measurement resistor R2.

The battery provides three ports, that is, a charging port, a discharging port, and a negative port.

The protection IC includes at least five pins, that is, a VDD (a positive terminal of the protection IC), a VSS (a negative terminal of the protection IC), a VM (a measurement terminal), a Dout (a discharging control terminal), and a Cout (a charging control terminal). Various protection parameters of the circuit may be obtained by using the VM terminal, and a protection control signal is generated by using a precise comparison device to control turn-on and turn-off of the MOSFET switch transistor (also referred to as a MOS transistor) connected to the protection IC, so as to implement a safety protection function. The protection IC may be an existing mature device in the current industry, and this is not limited in the present application.

The MOSFET switch transistor specifically includes at least two MOSFET transistors connected in series. When a driving control level applied by a driving control unit (the Cout or the Dout) is greater than a startup voltage of the MOSFET switch transistor, the MOSFET switch transistor is turned on, so that a circuit between the electrochemical cell and the negative port is conducted to implement charging or discharging of the electrochemical cell. When the driving control level applied by the driving control unit is less than the startup voltage of the MOSFET switch transistor, the MOSFET switch transistor is turned off, so that a circuit between the electrochemical cell and the negative port is cut off to stop charging or discharging of the electrochemical cell. A switch control function of the MOSFET switch transistor may alternatively be implemented by another switch device, for example, a triode.

It should be further noted that the MOS transistor has three ports. The three ports are respectively a G electrode, an S electrode, and a D electrode. A first end may be the S electrode, a second end may be the D electrode, and a third end may be the G electrode. Alternatively, a first end may be the D electrode, a second end may be the S electrode, and the third end may be the G electrode. Impedance of the MOS transistor may be changed by changing voltages at the G electrode and the S electrode.

The fuse element is typically a positive temperature coefficient resistor PTC. A working principle of the PTC is as follows: By means of a positive temperature coefficient characteristic of a PTC material resistance value and a Curie point mutation characteristic, when temperature increases due to a reason such as an overcurrent, the material resistance increases. Once the temperature reaches the Curie point, the resistance becomes sufficiently large to disconnect charging and discharging currents, thereby implementing the safety protection function. The fuse element may alternatively be a protection element such as a current fuse or a temperature fuse. This is not limited herein.

The resistor R1 and the capacitor C1 form a filter circuit, and the filter circuit may be configured to perform filter processing on a voltage flowing into the electrochemical cell or flowing out from the electrochemical cell. The resistor 2 is configured to measure a voltage and a current in the circuit.

Figure 2B:
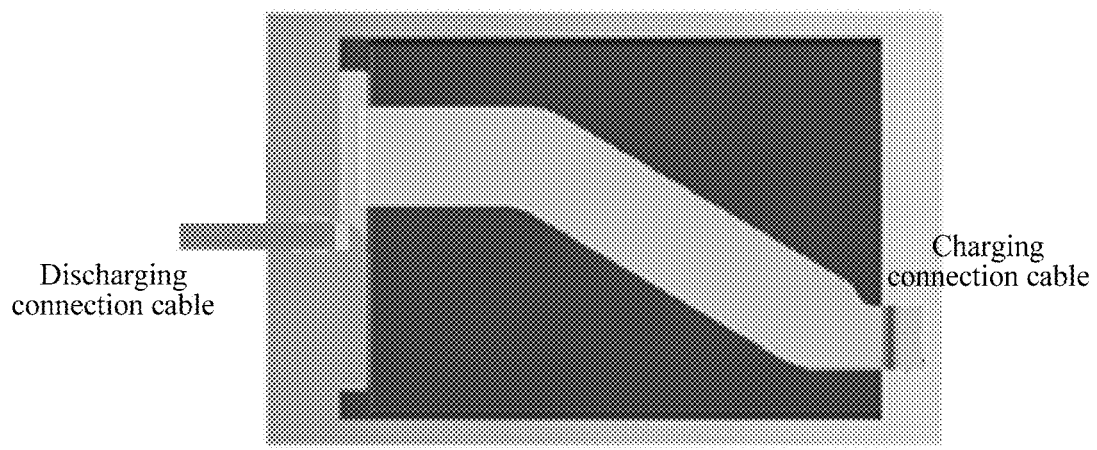
FIG. 2b is a schematic diagram of a connection cable of a dual-path battery according to an embodiment of the present application.

As shown in FIG. 2b, FIG. 2b is a schematic diagram of a connection cable of a dual-path battery. A design of the connection cable corresponds to a dual-port design of the battery, and a dual connection cable manner is used. The charging port and the discharging port are independent and different from each other in size, configuration and conductivity. For example, a charging port is connected by using a charging connection cable of a specification of 10 A, and a discharging port is connected by using a discharging connection cable of a specification of 4 A. The charging connection cable is also more thick then the discharging connection cable.

It should be noted that during charging, a charging and discharging circuit is connected to the charging port of the battery. A charging current enters the electrochemical cell by directly passing through the protection IC and the control switch without passing through the overcurrent protection element, to implement charging. It may be understood that to support a larger charging current range, the connection cable of the charging path is designed to be widened and thickened to reduce cable impedance. In the design of the charging path, because the charging current does not pass through the overcurrent protection element, no voltage loss or impedance heating is caused by impedance of the overcurrent protection element. The design of the charging path is more applicable to large-power, low-voltage, and large-current fast charging.

A connection cable of the charging and discharging circuit is usually made of copper. A size of the connection cable is selected according to a design requirement that a loss of the connection cable does not exceed a voltage loss and heat loss of the charging and discharging circuit. For example, assuming that the heat loss cannot exceed 0.225 W, size parameters of a charging connection cable may be shown in the following table.

| Material | Charging connection cable parameter | | | | | Maximum charging current/A | Voltage drop of maximum charging current/mV |
| --- | --- | --- | --- | --- | --- | --- | --- |
| | Thickness/μm | Width/mm | Length/mm | Impedance value/mΩ | Heat loss/W | | |
| Copper | 35 | 20 | 90 | 2.3 | 0.225 | 10 | 22.5 |
| Copper | 35 | 10 | 90 | 4.5 | 0.225 | 7 | 31.5 |
| Copper | 35 | 5 | 90 | 9.0 | 0.225 | 4 | 36.0 |
| Copper | 70 | 20 | 90 | 1.1 | 0.225 | 14 | 15.7 |
| Copper | 70 | 10 | 90 | 2.3 | 0.225 | 10 | 22.5 |
| Copper | 17.5 | 20 | 90 | 4.5 | 0.225 | 7 | 31.5 |
| Copper | 17.5 | 10 | 90 | 9.0 | 0.225 | 4 | 36.0 |

Figure 3:
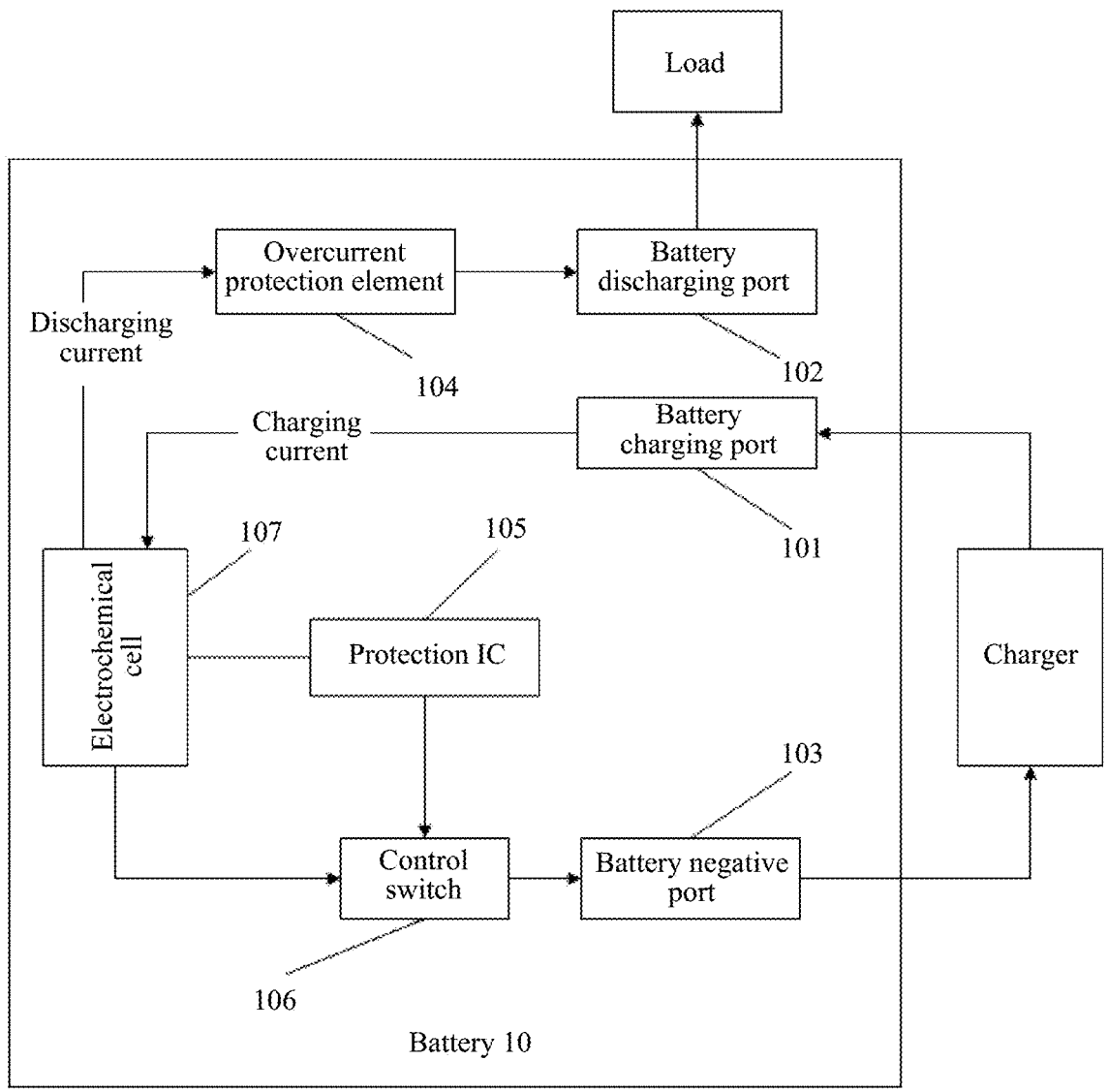
FIG. 3 is a schematic structural diagram of a battery according to an embodiment of the present application.

As shown in FIG. 3, FIG. 3 discloses a specific implementation of a battery. The battery 10 is a dual-path battery, and a charging circuit and a discharging circuit are different paths.

Specifically, the battery 10 includes a battery charging port 101, a battery discharging port 102, a battery negative port 103, an overcurrent protection element 104, a protection IC 105, a control switch 106, and an electrochemical cell 107. The battery charging port 101 and the battery discharging port 102 are ports independent of each other.

A positive electrode of the electrochemical cell 107 is connected to the battery charging port 101, a negative electrode of the electrochemical cell 107 is connected to a first end of the control switch 106, and a second end of the control switch 106 is connected to the battery negative port 103.

The protection IC 105 is connected in parallel to two ends of the electrochemical cell 107, and the protection IC 105 is further connected to a third end of the control switch 106.

The battery discharging port 102 is connected to a first end of the overcurrent protection element 104, and a second end of the overcurrent protection element 104 is connected to the positive electrode of the electrochemical cell 107.

It may be learned from the foregoing internal connection relationship of the battery that, a charging path of the battery 10 is that a current flows into the battery from the battery charging port 101, and reaches the electrochemical cell 107 through the control switch 106.

It may be understood that if the battery 10 is in a charging state, the control switch 106 is turned on, and the turned-on control switch may be considered as a section of a conducting wire. In this case, the charging path of the battery is that a current may directly reach the electrochemical cell 107 from the battery charging port 101.

A specific connection manner of the charging circuit is that the positive electrode of the electrochemical cell 107 is connected to the battery charging port 101, the negative electrode of the electrochemical cell 107 is connected to the first end of the control switch 106, and the second end of the control switch 106 is connected to the battery negative port 103.

The protection IC 105 is connected in parallel to the two ends of the electrochemical cell 107, and the protection IC 105 is further connected to the third end of the control switch 106. It may be understood that the protection IC may detect a voltage and a current, and send an instruction to the control switch 106 according to a voltage value and a current value, to enable the control switch 106 to be turned on or turned off according to the instruction.

It should be noted that a discharging path of the battery is that a current flows out from the electrochemical cell 107, reaches the battery discharging port 102 through the control switch 106 and the overcurrent protection element 104, and then flows out from the battery discharging port 102.

It may be understood that if the battery 10 is in a discharging state, the control switch 106 is turned on, and the turned-on control switch may be considered as a section of a conducting wire. In this case, the discharging path of the battery is that a current flows out from the electrochemical cell 107, reaches the battery discharging port through the overcurrent protection element 10, and then flows out from the battery discharging port.

A specific connection manner of the discharging circuit is that the battery discharging port 102 is connected to the first end of the overcurrent protection element 104, and the second end of the overcurrent protection element 104 is connected to the positive electrode of the electrochemical cell 107.

Figure 3A:
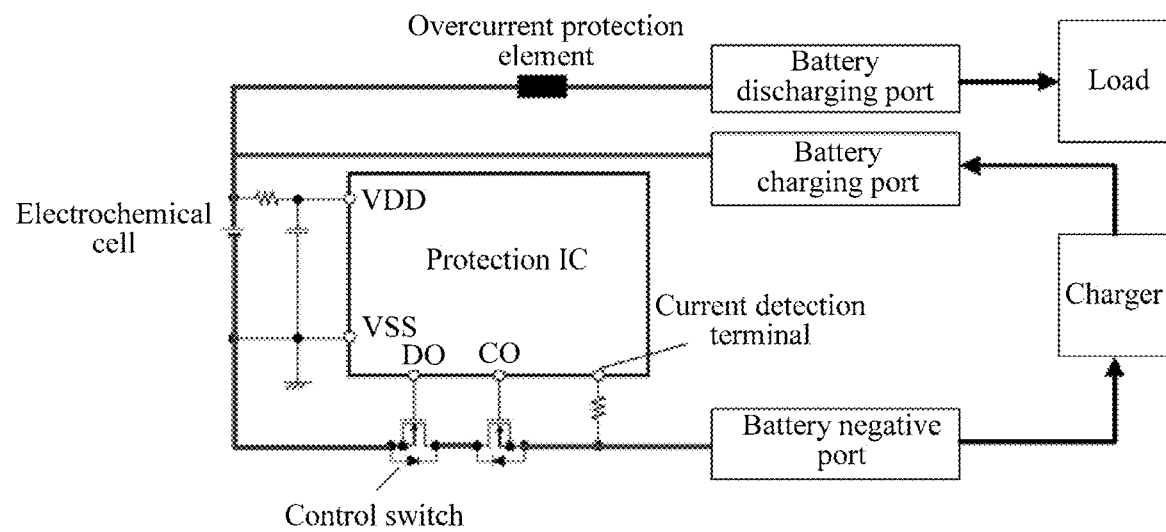
FIG. 3a is a circuit structural diagram of a battery according to another embodiment of the present application.

Optionally, as shown in FIG. 3a, to enable the protection IC 105 to accurately obtain voltages on two electrodes of the electrochemical cell 107, a filter circuit is further connected between the electrochemical cell 107 and the protection IC 105. Specifically, the filter circuit includes a first resistor and a capacitor, and the protection IC 105 includes a positive power source input terminal VDD and a negative power source input terminal VSS.

A manner of connecting the filter circuit to the electrochemical cell 107 is that a first end of the first resistor is connected to the positive electrode of the electrochemical cell, a second end of the first resistor is connected to a first end of the capacitor, and a second end of the capacitor is connected to the negative electrode of the electrochemical cell.

A manner of connecting the protection IC to the filter circuit is that the positive power source input terminal is connected to the first end of the capacitor, and the negative power source input terminal is connected to the second end of the capacitor.

Optionally, the protection IC 105 further includes a current detection terminal. The current detection terminal is connected to the battery negative port by using a second resistor. The protection IC 105 detects a charging current and a discharging current by using the current detection terminal.

Optionally, the protection IC 105 may be configured to: detect a voltage and a current of the circuit, and send an instruction to the control switch 106 according to a voltage value and a current value.

Specifically, as shown in FIG. 3a, the protection IC 105 includes a charging control terminal CO and a discharging control terminal DO, and the control switch 106 includes a first metal-oxide semiconductor field-effect transistor MOS transistor and a second MOS transistor.

A specific manner of connecting the protection IC 105 to the control switch 106 is that a first end of the first MOS transistor is connected to the negative electrode of the electrochemical cell, a second end of the first MOS transistor is connected to a first end of the second MOS transistor, and a third end of the first MOS transistor is connected to the charging control terminal; and a second end of the second MOS transistor is connected to the battery negative port, and a third end of the second MOS transistor is connected to the discharging control terminal.

Specifically, when the battery 10 is in the charging state, the protection IC 105 is configured to: detect a current value of a charging current and a voltage value of a charging voltage; and when the current value is less than a first current threshold and the voltage value is less than a first voltage threshold, send a turn-on instruction to the control switch 106; or when the current value is greater than a first current threshold or the voltage value is greater than a first voltage threshold, send a turn-off instruction to the control switch 106; and the control switch 106 is configured to: when receiving the turn-on instruction sent by the protection IC 105, perform switch turning-on to enable the charging current to flow to the electrochemical cell 107; or when receiving the turn-off instruction sent by the protection IC 105, perform switch turning-off to cut off the charging path.

Specifically, when the battery 10 is in a discharging state, the protection IC 105 is configured to: detect a current value of a discharging current and a voltage value of a discharging voltage; and when the current value is greater than a second current threshold or the voltage value is greater than a second voltage threshold, send a turn-off instruction to the control switch 106;

the control switch 106 is configured to: when receiving the turn-off instruction sent by the protection IC 105, turn off the switch to cut off the discharging path; and the overcurrent protection element 104 is configured to: detect whether the current value of the discharging current exceeds a third current threshold; and when the current value of the discharging current exceeds the third current threshold, cut off the discharging path.

It may be learned from the foregoing that the battery provided in this embodiment of the present application includes the charging path and the discharging path, and the charging path and the discharging path are different. The dual-path battery not only can ensure large-current fast charging without causing severe heating of the overcurrent protection element, but also can perform double protection on the discharging path, thereby ensuring fast charging performance and safety performance of the battery.

It should be noted that based on the battery provided in FIG. 3, an internal structure of the battery may be improved. For example, the control switch is disposed on the positive electrode, and details are shown in batteries in FIG. 4 and FIG. 5.

Figure 4:
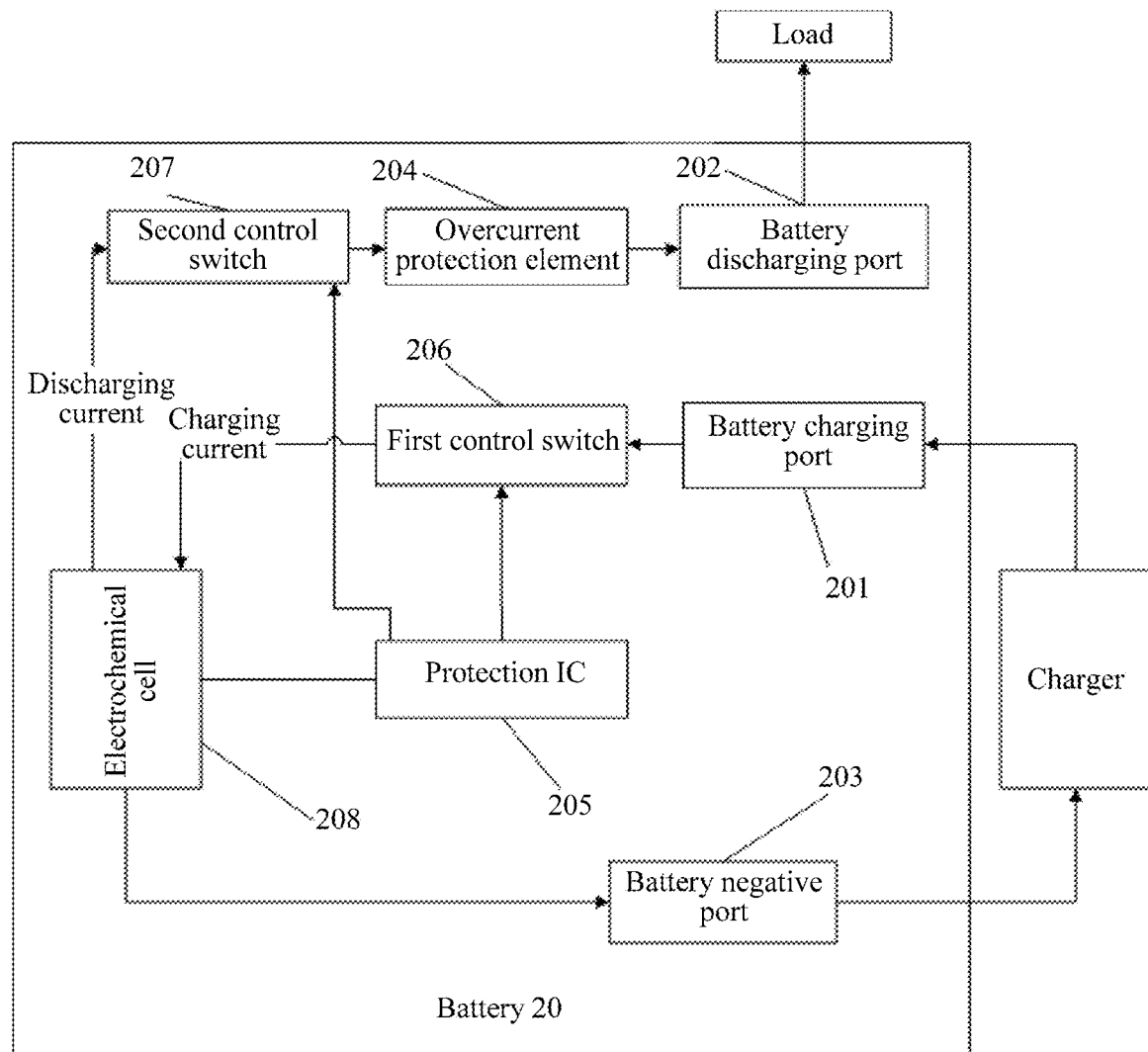
FIG. 4 is a schematic structural diagram of a battery according to another embodiment of the present application.

As shown in FIG. 4, FIG. 4 is an implementation of a battery. The battery 20 includes a battery charging port 201, a battery discharging port 202, a battery negative port 203, an overcurrent protection element 204, a protection IC 205, a first control switch 206, a second control switch 207, and an electrochemical cell 208. The battery charging port 201 and the battery discharging port 202 are ports independent of each other. The battery 20 is a dual-path battery, and a charging circuit and a discharging circuit are different links.

The first control switch 206 may be a MOS transistor, and the second control switch 207 may also be a MOS transistor.

A specific internal connection manner of the battery 20 is that the battery charging port 201 is connected to a first end of the first control switch 206, a second end of the first control switch 206 is connected to a positive electrode of the electrochemical cell 208, a third end of the first control switch 206 is connected to the protection IC 205, and a negative electrode of the electrochemical cell is connected to the battery negative port 203.

The protection IC 205 is connected in parallel to two ends of the electrochemical cell.

The battery discharging port 202 is connected to a first end of the overcurrent protection element 204, a second end of the overcurrent protection element 204 is connected to a first end of the second control switch 207, a second end of the second control switch 207 is connected to the positive electrode of the electrochemical cell, and a third end of the second control switch 207 is connected to the protection IC.

A charging path of the battery is that a current flows into the battery 20 from the battery charging port 201, and reaches the electrochemical cell 208 through the first control switch 206.

It may be understood that if the battery 20 is in a charging state, the control switch 106 is turned on, and the turned-on control switch may be equivalent to a section of a conducting wire. In this case, the charging path of the battery is that a current may directly reach the electrochemical cell 208 from the battery charging port 201.

A specific connection manner of the charging circuit is that the positive electrode of the electrochemical cell 208 is connected to the control switch 206, the control switch 206 is connected to the battery charging port 201, and the negative electrode of the electrochemical cell 208 is connected to the battery negative port 203.

The protection IC 205 is connected in parallel to two ends of the electrochemical cell 208, and the protection IC 205 is connected to the first control switch 206. The protection IC 205 may detect a value of a charging voltage and a value of a charging current, and may send an instruction to the first control switch 206 according to the value of the charging voltage and the value of the charging current, to enable the first control switch 206 to be turned on or turned off according to the instruction.

It should be noted that a discharging path of the battery is that a current flows out from the electrochemical cell 208, reaches the battery discharging port 202 through the second control switch 207 and the overcurrent protection element 204, and then flows out from the battery discharging port 202.

It may be understood that if the battery 20 is in the discharging state, the second control switch 207 is turned on, and the turned-on control switch may be equivalent to a section of a conducting wire. In this case, the discharging path of the battery is that a current flows out from the electrochemical cell 208, reaches the battery discharging port 202 through the overcurrent protection element 204, and then flows out from the battery discharging port 202.

A specific connection manner of the discharging circuit is that the battery discharging port 202 is connected to the first end of the overcurrent protection element 204, and the second end of the overcurrent protection element 204 is connected to the positive electrode of the electrochemical cell 208.

The protection IC 205 is connected to the second control switch 207. The protection IC 205 may detect a value of a discharging voltage and a value of a discharging current, and may send an instruction to the second control switch 207 according to the value of the discharging voltage and the value of the discharging current, to enable the second control switch 207 to be turned on or turned off according to the instruction.

It may be understood that to enable the protection IC 205 to accurately obtain voltages on two sides of the electrochemical cell 208, a filter circuit is further connected between the electrochemical cell 207 and the protection IC 205.

Specifically, the filter circuit includes a first resistor and a capacitor, and the protection IC 205 includes a positive power source input terminal and a negative power source input terminal.

A manner of connecting the filter circuit to the electrochemical cell 208 is that a first end of the first resistor is connected to the positive electrode of the electrochemical cell, a second end of the first resistor is connected to a first end of the capacitor, and a second end of the capacitor is connected to the negative electrode of the electrochemical cell.

A manner of connecting the protection IC 205 to the filter circuit is that the positive power source input terminal is connected to the first end of the capacitor, and the negative power source input terminal is connected to the second end of the capacitor.

It may be understood that the protection IC 205 further includes a current detection terminal. The current detection terminal is connected to the battery negative port by using a second resistor. The protection IC detects the charging current and the discharging current by using the current detection terminal.

Optionally, the protection IC detects a voltage and a current of the circuit, and sends an instruction to the control switch according to a voltage value and a current value.

Specifically, the protection IC includes a charging control terminal and a discharging control terminal. The first control switch is a first MOS transistor, and the second control switch is a second MOS transistor A third end of the first MOS transistor is connected to the charging control terminal, and a third end of the second MOS transistor is connected to the discharging control terminal.

Specifically, when the battery is in the charging state, the protection IC 205 is configured to: detect a current value of the charging current and a voltage value of the charging voltage; and when the current value is less than a first current threshold and the voltage value is less than a first voltage threshold, send a turn-on instruction to the first control switch 206; or when the charging current value is greater than a first current threshold or the voltage value is greater than a first voltage threshold, send a turn-off instruction to the first control switch 206; and the first control switch 206 is configured to: when receiving the turn-on instruction sent by the protection IC 205, perform switch turning-on to enable the charging current to flow to the electrochemical cell; or when receiving the turn-off instruction sent by the protection IC, perform switch turning-off to cut off the charging path.

Specifically, when the battery is in the discharging state, the protection IC 205 is configured to: detect a current value of the discharging current and a voltage value of the discharging voltage; and when the discharging current value is greater than a second current threshold or the voltage value is greater than a second voltage threshold, send a turn-off instruction to the second control switch 207;

the second control switch 207 is configured to: when receiving the turn-off instruction sent by the protection IC, turn off the switch to cut off the discharging path; and the overcurrent protection element 204 is configured to: detect whether the current value of the discharging current exceeds a third current threshold; and when the current value of the discharging current exceeds the third current threshold, cut off the discharging path.

It may be learned from the foregoing that the battery provided in this embodiment of the present application includes both the charging path and the discharging path, and the overcurrent protection element is located on the discharging path. Therefore, during current charging, overcurrent disconnection by the overcurrent protection element is not caused. In addition, the protection IC may control the battery to perform safe charging. Because the overcurrent protection element is on the discharging path, when the battery is discharged, the protection IC and the overcurrent protection element can perform double protection on the discharging circuit. The dual-path battery provided in the present application not only can ensure large-current fast charging without causing severe heating of the overcurrent protection element, but also can perform double protection on the discharging path, thereby ensuring fast charging performance and safety performance of the battery.

Figure 5:
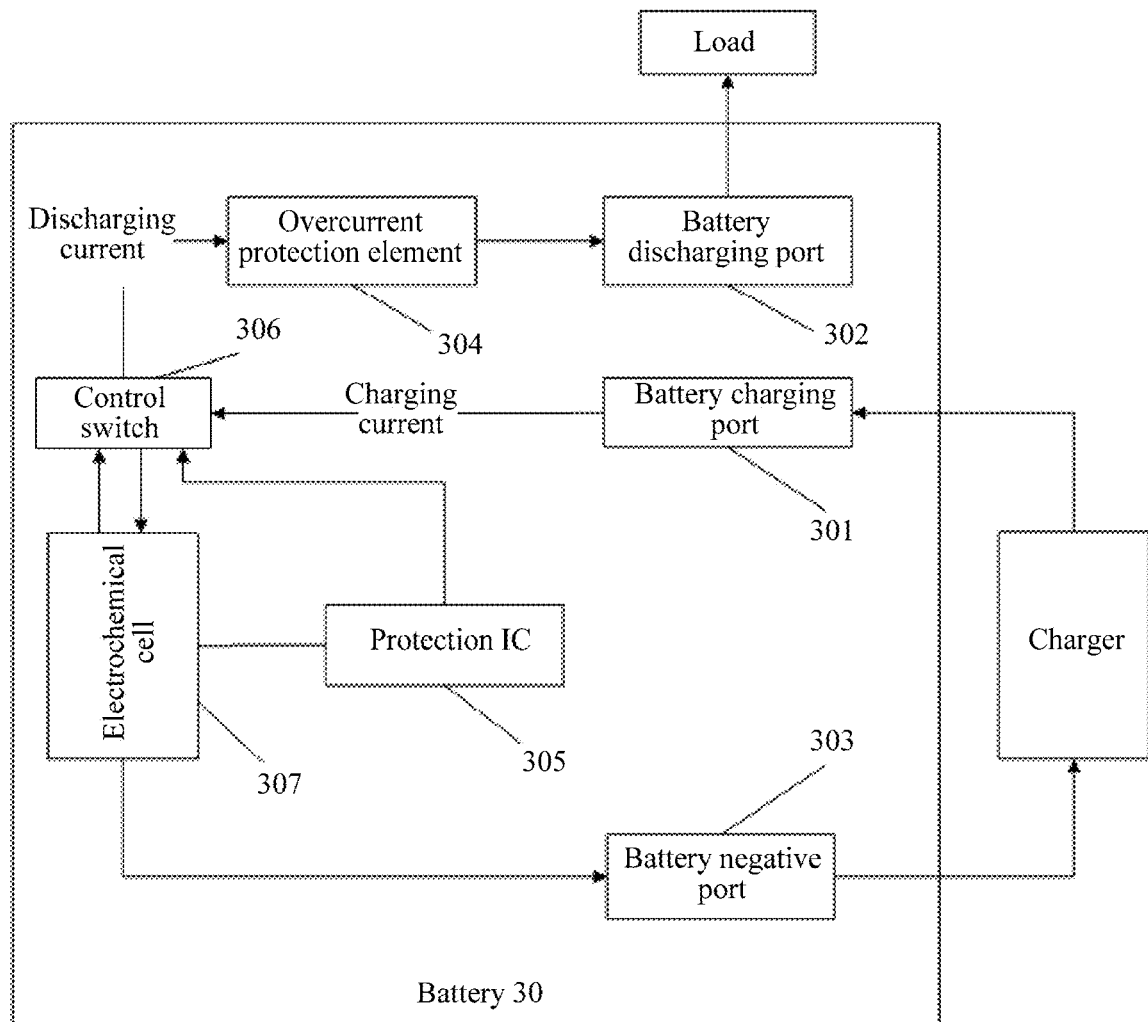
FIG. 5 is a schematic structural diagram of a battery according to another embodiment of the present application.

As shown in FIG. 5, FIG. 5 discloses a specific implementation of a battery. The battery 30 is a dual-path battery, and a charging circuit and a discharging circuit are different links.

Specifically, the battery 30 includes a battery charging port 301, a battery discharging port 302, a battery negative port 303, an overcurrent protection element 304, a protection IC 305, a control switch 306, and an electrochemical cell 307. The battery charging port 301 and the battery discharging port 302 are ports independent of each other.

The battery charging port 301 is connected to a first end of the control switch 306, and a second end of the control switch 306 is connected to a positive electrode of the electrochemical cell 307.

A negative electrode of the electrochemical cell 307 is connected to the battery negative port 303.

The protection IC 305 is connected in parallel to two ends of the electrochemical cell 307, and the protection IC 305 is further connected to a third end of the control switch 306.

The battery discharging port 302 is connected to a first end of the overcurrent protection element 304, and a second end of the overcurrent protection element 304 is connected to the first end of the control switch 306.

It may be learned from the foregoing internal connection relationship of the battery 30 that, a charging path of the battery 30 is that a current flows into the battery from the battery charging port 303, and reaches the electrochemical cell 307 through the control switch 306.

It may be understood that if the battery 30 is in a charging state, the control switch 306 is turned on, and the turned-on control switch may be considered as a section of a conducting wire. In this case, the charging path of the battery is that a current may directly reach the electrochemical cell 307 from the battery charging port 303.

A specific connection manner of the charging circuit is that the positive electrode of the electrochemical cell 307 is connected to the control switch 306, the control switch 306 is connected to the battery charging port 301, and the negative electrode of the electrochemical cell 307 is connected to the battery negative port 303.

The protection IC 305 is connected in parallel to the two ends of the electrochemical cell 307, and the protection IC 305 is further connected to the third end of the control switch 306. It may be understood that the protection IC 305 may detect a voltage and a current, and send an instruction to the control switch 306 according to a voltage value and a current value, to enable the control switch 306 to be turned on or turned off according to the instruction.

It should be noted that a discharging path of the battery is that a current flows out from the electrochemical cell 307, reaches the battery discharging port 302 through the control switch 306 and the overcurrent protection element 304, and then flows out from the battery discharging port 302.

It may be understood that if the battery 30 is in a discharging state, the control switch 306 is turned on, and the turned-on control switch may be equivalent to a section of a conducting wire. In this case, the discharging path of the battery 30 is that a current flows out from the electrochemical cell 307, reaches the battery discharging port through the overcurrent protection element 304, and then flows out from the battery discharging port.

It may be understood that a specific connection manner of the discharging circuit is that the battery discharging port 302 is connected to the overcurrent protection element 304, the overcurrent protection element 304 is connected to the control switch 306, the control switch 306 is connected to the positive electrode of the electrochemical cell 307, and the negative electrode of the electrochemical cell 307 is connected to the battery negative port 303.

Optionally, to enable the protection IC 305 to accurately obtain voltages on two sides of the electrochemical cell 307, a filter circuit is further connected between the electrochemical cell 307 and the protection IC 305. Specifically, the filter circuit includes a first resistor and a capacitor, and the protection IC 305 includes a positive power source input terminal and a negative power source input terminal.

A manner of connecting the filter circuit to the electrochemical cell 307 is that a first end of the first resistor is connected to the positive electrode of the electrochemical cell, a second end of the first resistor is connected to a first end of the capacitor, and a second end of the capacitor is connected to the negative electrode of the electrochemical cell.

A manner of connecting the protection IC to the filter circuit is that the positive power source input terminal is connected to the first end of the capacitor, and the negative power source input terminal is connected to the second end of the capacitor.

Optionally, the protection IC 305 further includes a current detection terminal. The current detection terminal is connected to the battery negative port by using a second resistor. The protection IC 305 detects a charging current and a discharging current by using the current detection terminal.

Optionally, the protection IC 305 may be configured to: detect a voltage and a current of the circuit, and send an instruction to the control switch 306 according to a voltage value and a current value.

Specifically, the protection IC 305 includes a charging control terminal and a discharging control terminal, and the control switch 306 includes a first metal-oxide semiconductor field-effect transistor MOS transistor and a second MOS transistor.

A specific manner of connecting the protection IC 305 to the control switch 306 is that a first end of the first MOS transistor is connected to the negative electrode of the electrochemical cell, a second end of the first MOS transistor is connected to a first end of the second MOS transistor, and a third end of the first MOS transistor is connected to the charging control terminal; and a second end of the second MOS transistor is connected to the battery negative port, and a third end of the second MOS transistor is connected to the discharging control terminal.

Specifically, when the battery 30 is in the charging state, the protection IC 305 is configured to: detect a current value of a charging current and a voltage value of a charging voltage; and when the current value is less than a first current threshold and the voltage value is less than a first voltage threshold, send a turn-on instruction to the control switch 306; or when the current value is greater than a first current threshold or the voltage value is greater than a first voltage threshold, send a turn-off instruction to the control switch 306; and the control switch 306 is configured to: when receiving the turn-on instruction sent by the protection IC 305, perform switch turning-on to enable the charging current to flow to the electrochemical cell 307; or when receiving the turn-off instruction sent by the protection IC 305, perform switch turning-off to cut off the charging path.

Specifically, when the battery 30 is in the discharging state, the protection IC 305 is configured to: detect a current value of a discharging current and a voltage value of a discharging voltage; and when the current value is greater than a second current threshold or the voltage value is greater than a second voltage threshold, send a turn-off instruction to the control switch 306;

the control switch 306 is configured to: when receiving the turn-off instruction sent by the protection IC 305, turn off the switch to cut off the discharging path; and the overcurrent protection element 304 is configured to: detect whether the current value of the discharging current exceeds a third current threshold; and when the current value of the discharging current exceeds the third current threshold, cut off the discharging path.

It may be learned from the foregoing that the battery provided in this embodiment of the present application includes the charging path and the discharging path, and the charging path and the discharging path are different. The dual-path battery not only can ensure large-current fast charging but also can perform double protection on the discharging path, thereby ensuring fast charging performance and safety performance of the battery.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A battery, wherein the battery comprises a battery charging port, a battery discharging port, a battery negative port, an overcurrent protection element, a protection integrated circuit, a control switch, and an electrochemical cell, wherein the battery charging port and the battery discharging port are ports independent of each other;

wherein the battery charging port is connected to a positive electrode of the electrochemical cell, wherein a negative electrode of the electrochemical cell is connected to a first end of the control switch, and wherein a second end of the control switch is connected to the battery negative port;

wherein the protection integrated circuit is connected in parallel to the positive electrode and the negative electrode of the electrochemical cell, and the protection integrated circuit is further connected to a third end of the control switch; and wherein the battery discharging port is connected to a first end of the overcurrent protection element, and wherein a second end of the overcurrent protection element is connected to the positive electrode of the electrochemical cell.

2. The battery according to claim 1, wherein a filter circuit is further connected between the protection integrated circuit and the electrochemical cell;

wherein the protection integrated circuit comprises a positive power source input terminal and a negative power source input terminal; and wherein the filter circuit comprises a first resistor and a capacitor, wherein a first end of the first resistor is connected to the positive electrode of the electrochemical cell, wherein a second end of the first resistor is connected to a first end of the capacitor, and wherein a second end of the capacitor is connected to the negative electrode of the electrochemical cell; and wherein the positive power source input terminal is connected to the first end of the capacitor, and wherein the negative power source input terminal is connected to the second end of the capacitor.

3. The battery according to claim 1, wherein:

the control switch comprises a first metal-oxide semiconductor field-effect transistor MOS transistor and a second MOS transistor; and the protection integrated circuit comprises a charging control terminal and a discharging control terminal, wherein:

a first end of the first MOS transistor is connected to the negative electrode of the electrochemical cell, a second end of the first MOS transistor is connected to a first end of the second MOS transistor, and a third end of the first MOS transistor is connected to the charging control terminal; and a second end of the second MOS transistor is connected to the battery negative port, and a third end of the second MOS transistor is connected to the discharging control terminal.

4. The battery according to claim 1, wherein, when the battery is in a charging state:
the protection integrated circuit is configured to:
detect a current value of a charging current and a voltage value of a charging voltage; and
when the current value is less than a first current threshold and the voltage value is less than a first voltage threshold, send a turn-on instruction to the control switch; or
when the current value is greater than a first current threshold or the voltage value is greater than a first voltage threshold, send a turn-off instruction to the control switch; and
the control switch is configured to:
when receiving the turn-on instruction sent by the protection integrated circuit, perform switch turning-on to enable the charging current to flow to the electrochemical cell; or
when receiving the turn-off instruction sent by the protection integrated circuit, perform switch turning-off to cut off a charging path.

5. The battery according to claim 1, wherein, when the battery is in a discharging state:
the protection integrated circuit is configured to:
detect a current value of a discharging current and a voltage value of a discharging voltage; and
when the current value is greater than a second current threshold or the voltage value is greater than a second voltage threshold, send a turn-off instruction to the control switch;
the control switch is configured to:
when receiving the turn-off instruction sent by the protection integrated circuit, turn off the switch to cut off a discharging path; and
the overcurrent protection element is configured to:
detect whether the current value of the discharging current exceeds a third current threshold; and
when the current value of the discharging current exceeds the third current threshold, cut off the discharging path.

6. The battery according to claim 1, wherein the protection integrated circuit further comprises a current detection terminal; and
wherein the current detection terminal is connected to the battery negative port by using a second resistor.

7. The battery according to claim 1, wherein the battery charging port and the battery discharging port are independent and different from each other in size, configuration and conductivity.

8. A battery, wherein the battery comprises a battery charging port, a battery discharging port, a battery negative port, an overcurrent protection element, a protection integrated circuit, a first control switch, a second control switch, and an electrochemical cell, wherein the battery charging port and the battery discharging port are ports independent of each other;
wherein the battery charging port is connected to a first end of the first control switch, wherein a second end of the first control switch is connected to a positive electrode of the electrochemical cell, and wherein a third end of the first control switch is connected to the protection integrated circuit;
wherein a negative electrode of the electrochemical cell is connected to the battery negative port;
wherein the protection integrated circuit is connected in parallel to the positive and negative electrodes of the electrochemical cell; and
wherein the battery discharging port is connected to a first end of the overcurrent protection element, wherein a second end of the overcurrent protection element is connected to a first end of the second control switch, wherein a second end of the second control switch is connected to the positive electrode of the electrochemical cell, and wherein a third end of the second control switch is connected to the protection integrated circuit.

9. The battery according to claim 8, wherein the protection integrated circuit comprises a charging control terminal and a discharging control terminal; and
wherein the third end of the first control switch is connected to the charging control terminal and the third end of the second control switch is connected to the discharging control terminal.

10. The battery according to claim 8, wherein a filter circuit is further connected between the protection integrated circuit and the electrochemical cell;
wherein the filter circuit comprises a first resistor and a capacitor; and
wherein the protection integrated circuit comprises a positive power source input terminal VDD and a negative power source input terminal VSS, wherein:
a first end of the resistor is connected to the positive electrode of the electrochemical cell, a second end of the inductor is connected to a first end of the capacitor, and a second end of the capacitor is connected to the negative electrode of the electrochemical cell; and
the positive power source input terminal is connected to the first end of the capacitor and the negative power source input terminal is connected to the second end of the capacitor.

11. A battery, wherein the battery comprises a battery charging port, a battery discharging port, a battery negative port, an overcurrent protection element, a protection integrated circuit, a control switch, and an electrochemical cell, wherein the battery charging port and the battery discharging port are ports independent of each other;
wherein the battery charging port is connected to a first end of the control switch, and a second end of the control switch is connected to a positive electrode of the electrochemical cell;
wherein a negative electrode of the electrochemical cell is connected to the battery negative port;
wherein the protection integrated circuit is connected in parallel to two ends of the electrochemical cell, and wherein the protection integrated circuit is further connected to a third end of the control switch; and
wherein the battery discharging port is connected to a first end of the overcurrent protection element, and wherein a second end of the overcurrent protection element is connected to the first end of the control switch.

12. The battery according to claim 11, wherein:
the control switch comprises a first MOSFET switch (MOS) transistor and a second MOS transistor;
the protection integrated circuit comprises a charging control terminal and a discharging control terminal, wherein:
a first end of the first MOS transistor is connected to the second end of the overcurrent protection element, and the first end of the first MOS transistor is further connected to the battery charging port;

a second end of the first MOS transistor is connected to a first end of the second MOS transistor, and a third end of the first MOS transistor is connected to the charging control terminal; and a second end of the second MOS transistor is connected to the positive electrode of the electrochemical cell, and a third end of the second MOS transistor is connected to the discharging control terminal.

13. The battery according to claim 12, wherein a filter circuit is further connected between the protection integrated circuit and the electrochemical cell;

the filter circuit comprises a first resistor and a capacitor; and the protection integrated circuit comprises a positive power source input terminal and a negative power source input terminal, wherein:

a first end of the first resistor is connected to the positive electrode of the electrochemical cell, a second end of the first resistor is connected to a first end of the capacitor, and a second end of the capacitor is connected to the negative electrode of the electrochemical cell; and the positive power source input terminal is connected to the first end of the capacitor, and the negative power source input terminal is connected to the second end of the capacitor.

14. A terminal, wherein the terminal comprises a charging port, a load, and a charging and discharging circuit of the terminal, and a battery, wherein:

the battery comprises a battery charging port, a battery discharging port, a battery negative port, an overcurrent protection element, a protection integrated circuit, a control switch, and an electrochemical cell, wherein the battery charging port and the battery discharging port are ports independent of each other;

wherein the battery charging port is connected to a positive electrode of the electrochemical cell, wherein a negative electrode of the electrochemical cell is connected to a first end of the control switch, and wherein a second end of the control switch is connected to the battery negative port;

wherein the protection integrated circuit is connected in parallel to the positive electrode and the negative electrode of the electrochemical cell, and the protection integrated circuit is further connected to a third end of the control switch; and wherein the battery discharging port is connected to a first end of the overcurrent protection element, and wherein a second end of the overcurrent protection element is connected to the positive electrode of the electrochemical cell; and wherein:

the charging and discharging circuit comprises a detection circuit, a protection circuit, and a power conversion circuit;

wherein the detection circuit is connected to the charging port of the terminal, wherein the detection circuit is further connected to the protection circuit, and wherein the protection circuit is further connected to the battery charging port; and wherein the power conversion circuit is connected to the load, and wherein the power conversion circuit is further connected to the battery discharging port, wherein:

when the terminal is in a charging state, a charging current enters the terminal through the charging port of the terminal, and enters the electrochemical cell through the detection circuit, the protection circuit, and the control switch; and when the terminal is in a discharging state, a discharging path from the electrochemical cell, and to the load through the control switch, the overcurrent protection element, and the power conversion circuit.

15. The terminal according to claim 14, wherein:

when the terminal is in the charging state:

the detection circuit is configured to:

detect a current value of the charging current and a voltage value of the charging voltage; and send the current value of the charging current and the voltage value of the charging current to the protection circuit; and the protection circuit is configured to:

determine whether the current value of the charging current is greater than a first protection threshold and the voltage value of the charging current is greater than a second protection threshold; and cut off a charging path when the current value of the charging current is greater than the first protection threshold or the voltage value of the charging current is greater than the second protection threshold.

16. The terminal according to claim 15, wherein:

when the terminal is in the discharging state;

the power conversion circuit is configured to:

receive a discharging current and a discharging voltage provided by the battery; and convert the discharging current and the discharging voltage according to a preset ratio, so as to provide a voltage and a current that are obtained after the conversion to the load.

17. The terminal according to claim 14, wherein the charging port and the discharging port are independent and different from each other in size, configuration and conductivity.

18. A charging system, wherein the charging system comprises a charger, a connection cable, and a terminal, wherein the charger is connected to the terminal by using the connection cable, and wherein the terminal comprises a charging port, a load, a charging and discharging circuit of the terminal, and a battery, wherein:

the battery comprises a battery charging port, a battery discharging port, a battery negative port, an overcurrent protection element, a protection integrated circuit, a control switch, and an electrochemical cell, wherein the battery charging port and the battery discharging port are ports independent of each other;

wherein the battery charging port is connected to a positive electrode of the electrochemical cell, wherein a negative electrode of the electrochemical cell is connected to a first end of the control switch, and wherein a second end of the control switch is connected to the battery negative port;

wherein the protection integrated circuit is connected in parallel to the positive electrode and the negative electrode of the electrochemical cell, and the protection integrated circuit is further connected to a third end of the control switch; and wherein the battery discharging port is connected to a first end of the overcurrent protection element, and wherein a second end of the overcurrent protection element is connected to the positive electrode of the electrochemical cell; and wherein:
the charging and discharging circuit comprises a detection circuit, a protection circuit, and a power conversion circuit;

wherein the detection circuit is connected to the charging port of the terminal, wherein the detection circuit is further connected to the protection circuit, and wherein the protection circuit is further connected to the battery charging port; and wherein the power conversion circuit is connected to the load, and wherein the power conversion circuit is further connected to the battery discharging port, wherein:

when the terminal is in a charging state, a charging current enters the terminal through the charging port of the terminal, and enters the electrochemical cell through the detection circuit, the protection circuit, and the control switch; and when the terminal is in a discharging state, a discharging path from the electrochemical cell, and to the load through the control switch, the overcurrent protection element, and the power conversion circuit.

* * * * *

UNITED STATES PATENT AND TRADEMARK OFFICE
CERTIFICATE OF CORRECTION

PATENT NO. : 10,797,493 B2  
APPLICATION NO. : 16/359061  
DATED : October 6, 2020  
INVENTOR(S) : Xinyu Liu et al.

Page 1 of 1

It is certified that error appears in the above-identified patent and that said Letters Patent is hereby corrected as shown below:

In the Claims

Column 26, Line 31, Claim 16, delete "state;" and insert -- state: --, therefor.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*